US009784568B2

(12) United States Patent
Laguarta Bertran et al.

(10) Patent No.: US 9,784,568 B2
(45) Date of Patent: Oct. 10, 2017

(54) METHOD AND DEVICE FOR NON-CONTACT THREE DIMENSIONAL OBJECT SURFACE IMAGING

(75) Inventors: Ferran Laguarta Bertran, Manresa (ES); Agustí Pintó Vila, El Pont De Vilomara (ES); Roger Artigas Pursals, Santa Eulàlia De Rançana (ES); Cristina Cadevall Artigues, Terrassa (ES)

(73) Assignee: UNIVERSITAT POLITÈCNICA DE CATALUNYA, Barcelona (ES)

(*) Notice: Subject to any disclaimer, the term of this patent is extended or adjusted under 35 U.S.C. 154(b) by 564 days.

(21) Appl. No.: 14/117,805

(22) PCT Filed: May 20, 2011

(86) PCT No.: PCT/EP2011/058281
§ 371 (c)(1),
(2), (4) Date: Nov. 14, 2013

(87) PCT Pub. No.: WO2012/159651
PCT Pub. Date: Nov. 29, 2012

(65) Prior Publication Data
US 2014/0071263 A1    Mar. 13, 2014

(51) Int. Cl.
*G01B 11/24* (2006.01)
*G01B 11/25* (2006.01)
(Continued)

(52) U.S. Cl.
CPC .......... *G01B 11/24* (2013.01); *G01B 11/2518* (2013.01); *G01M 11/025* (2013.01); *G02B 21/0016* (2013.01); *G02B 21/06* (2013.01)

(58) Field of Classification Search
CPC ... G01B 11/24; G01B 11/025; G01B 11/2518; G02B 21/0016; G02B 21/06; G01C 3/08
See application file for complete search history.

(56) References Cited

U.S. PATENT DOCUMENTS 4,473,750 A    9/1984 Oshida et al.
4,634,880 A    1/1987 Lindow et al.
(Continued)

FOREIGN PATENT DOCUMENTS

CN    101408478 B    7/2010
EP    1555561 B1    9/2007
(Continued)

OTHER PUBLICATIONS

International Search Report and Written Opinion of the International Searching Authority. International Application No. PCT/EP2011/058281, issued by the European Patent Office, mail date Feb. 1, 2012, Rijswijk Netherlands.

*Primary Examiner* — Neil Mikeska
*Assistant Examiner* — Marnie Matt
(74) *Attorney, Agent, or Firm* — Peter B. Scull; Hamilton, DeSanctis & Cha LLP

(57) ABSTRACT

A slit m is projected onto an object surface in which reference point $X_1$ is in a horizontal axis x closest to in focus point P. One image of a field of view area F is acquired after reflection of light comprising said reference point $X_1$. Position $Z_1$ of the object in a vertical axis z is determined. Images of respective field of view areas F are acquired after reflection of light having reference points $X_2$, $X_3$ ... $X_n$ by simultaneously moving the object along axis z to maintain reference points $X_2$, $X_3$ ... $X_n$ closest to in focus point P. Positions $Z_2$, $Z_3$ ... $Z_n$ in which images were acquired are determined. The in focus point P along horizontal axis x is determined for each image. A correction differential $\Delta_1$, $\Delta_2$ ... $\Delta_n$ between in focus point P and reference points $X_1$, $X_2$ ... $X_n$ is calculated.

16 Claims, 3 Drawing Sheets

(51) Int. Cl.
  *G01M 11/02*   (2006.01)
  *G02B 21/00*   (2006.01)
  *G02B 21/06*   (2006.01)

(56) References Cited

U.S. PATENT DOCUMENTS

| | | |
|---|---|---|
| 4,640,620 A | 2/1987 | Schmidt |
| 4,707,610 A | 11/1987 | Lindow et al. |
| 4,748,335 A | 5/1988 | Lindow et al. |
| 4,900,940 A * | 2/1990 | Nakamura ............ G01B 11/24 250/559.23 |
| 4,903,413 A | 2/1990 | Bellwood |
| 5,004,346 A * | 4/1991 | KuMichael ........ G01M 11/0271 356/513 |
| 5,248,876 A * | 9/1993 | Kerstens ................ G01B 9/04 250/201.3 |
| 5,543,918 A | 8/1996 | Abraham et al. |
| 5,557,113 A | 9/1996 | Moorhouse et al. |
| 5,659,384 A * | 8/1997 | Ina ..................... G02B 21/0016 355/53 |
| 5,737,084 A * | 4/1998 | Ishihara ................ G01B 11/24 356/609 |
| 5,841,894 A * | 11/1998 | Horie ................... G01B 11/24 356/608 |
| 6,248,988 B1 | 6/2001 | Krantz |
| 6,373,978 B1 | 4/2002 | Ishihara |
| 7,038,793 B2 | 5/2006 | Schick |
| 7,205,531 B2 | 4/2007 | Watanabe et al. |
| 7,209,242 B2 * | 4/2007 | Nakamura ........... G02B 21/002 356/601 |
| 7,649,628 B2 | 1/2010 | Wadman |
| 7,877,227 B2 | 1/2011 | McDonnell et al. |
| 7,948,634 B2 | 5/2011 | Bankhead et al. |
| 2003/0002049 A1* | 1/2003 | Kuchel .............. G01B 11/2441 356/513 |
| 2003/0098967 A1* | 5/2003 | Christoph ............ G01B 11/007 356/4.05 |
| 2005/0002042 A1* | 1/2005 | Schick ............... G01B 11/0608 356/614 |
| 2005/0151978 A1* | 7/2005 | Nakamura ........... G02B 21/002 356/602 |
| 2005/0161592 A1* | 7/2005 | Watanabe ........... G02B 21/006 250/234 |
| 2006/0146316 A1* | 7/2006 | Hong ................... G01B 11/255 356/124 |
| 2008/0215271 A1 | 9/2008 | Bankhead et al. |
| 2009/0012743 A1 | 1/2009 | McDonnell et al. |
| 2009/0116023 A1 | 5/2009 | Wadman |
| 2009/0153878 A1* | 6/2009 | Fujii ..................... G01B 11/24 356/601 |
| 2010/0128276 A1* | 5/2010 | De Groot ........... G01B 11/2441 356/450 |
| 2011/0144505 A1* | 6/2011 | Yamamoto ........... A61B 5/0064 600/476 |
| 2013/0293704 A1* | 11/2013 | Imamura ................. G01C 3/08 348/135 |
| 2015/0192769 A1* | 7/2015 | Dresel ................. G02B 21/367 356/450 |

FOREIGN PATENT DOCUMENTS

| | | |
|---|---|---|
| JP | 2004157410 A | 6/2004 |
| WO | WO9000754 A1 | 1/1990 |
| WO | WO02097364 A1 | 12/2002 |

* cited by examiner

METHOD AND DEVICE FOR NON-CONTACT THREE DIMENSIONAL OBJECT SURFACE IMAGING

TECHNICAL FIELD

A non-contact surface metrology method is herein disclosed.

A device for non-contact measuring of surfaces is also disclosed.

BACKGROUND

Optical components having flat and spherical surfaces are relatively easy of manufacturing and measuring. However, due to their limited performance by aberrations, they are being replaced with optical components having complex surfaces, such as aspherical and freeform surfaces. Optical components with complex surfaces allow for elimination of aberrations and provide many other advantages. They are obtained through the use of machining, polishing and metrology techniques.

In more recent years, advanced manufacturing technologies for such optical components have been developed due to a demand for ever-complex optical surfaces to be machined. Metrology requirements for such optical components are therefore becoming increasingly higher.

Surface metrology for surface characterization is currently carried out through different techniques such as contact measurement, scanning probe measurement and non-contact measurement.

Contact measurement is based on the use of a small stylus tip that is dragged across the sample. Peaks and valleys on the sample surface are tracked by the tip. The up and down movement of the tip is converted into a signal that is processed into digital data useful for building a curve related to the position in the sample versus the height at that point of the sample.

A constant force has to be exerted by the tip on the sample surface in order to correctly follow its shape. Therefore, a main disadvantage of contact based measurement is that it is destructive since the measuring tip is always in contact with the sample being measured. A further disadvantage of contact measurement techniques is that, although currently tips under the micrometer scale can be manufactured, details smaller than the dimension of the tip itself cannot be measured.

Scanning probe measurement is based on the use of a probe that is operated close to the surface to be measured at a distance where the forces between the probe and the surface are present. Atomic force microscopy is used in this technique for measuring aspheric surfaces.

Non-contact measurement can be carried out through interferometry, confocal profilometry or laser autofocus techniques.

In the interferometry technique, interference fringes are assessed when a reference beam overlaps in the observation plane over a beam carrying information on the surface that is measured. Phase differences in the reflected beam are measured and converted into height information such that a surface profile can be obtained.

Through the use of interferometers, information is obtained on the topography of the sample surface that is measured. The wavefront from the sample is compared to a reference wavefront such that the overlap in a detector, usually a camera, results in an interference pattern from which the difference in height between measurement surface and a reference surface (usually a flat mirror) can be assessed. For measuring aspheric surfaces the reference wavefront has to be modified to be as similar as possible to the measurement wavefront. This is necessary in order to perform the measurement due to the nature of the interferometric signal. When the phase difference between the two wavefronts is large the fringes in the interference pattern are so compressed that the camera can not resolve them and some information is lost. The technique of modifying the wavefront reference to make it similar to the wavefront measurement is referred to as nulling. For spherical or flat samples, it is easy to get a spherical or flat reference wavefront. However, for aspheric surfaces it is much more complex as an aspherical reference wavefront is required.

Confocal profilometry is performed by confocal microscopes in which the sample is illuminated through a very small pinhole and observed with a photodetector placed after a second small pinhole. In this way, only the light exactly coming from the focus plane will reach the photodetector. By rejecting out of focus light, the image then comes from a thin section of the object (small depth of field) such that by scanning many thin sections through the object a very clean three-dimensional image thereof can be built up.

Confocal depth sectioning can also be attained using structured patterns of light projected on a sample and depth-of-focus algorithms.

WO9000754 shows an approach to confocal microscopy. A confocal microscope comprises a light source for supplying a light beam to a lens that focuses the light onto an object to be examined so as to illuminate a point observational field on or within the object. Reflected light from the illuminated point field is collected by condenser and transmitted to detector. Scanning means causes illuminated point field to move in scanning pattern relative to object. The outgoing light passing from light source to condenser and the returning light are transmitted via optical fibers and a light separator to divert the return light to detector.

Laser autofocus technique can be considered as the optical equivalent to the contact measurement technique. In this case, however, the stylus tip is replaced by an optical tip, that is, the focal point of a microscope objective lens. In one example of laser autofocus technique, an off-axis laser beam is output on the sample under analysis through microscope objective lens. If the sample is at the focal point the laser beam is reflected reaching a detector center. If the sample is out of focus the laser beam will reach another region of the detector. As this is detected, the objective lens is moved so that the laser beam impinges again on the detector center. For performing a measurement, this technique is based on moving the optical tip that represents the laser beam across the sample and refocusing the sample at each position so that the distance between the measuring system and the sample is kept always constant (autofocus). Information on the surface topography is thus obtained from the movement performed by the system along the sample in order to keep it always in focus.

The above metrology techniques allow the shape and the texture of complex surfaces to be accurately assessed. Data acquired are compared with design data in order to obtain correction data that is then delivered to polishing systems. Said acquired data correspond to shape specifications in the range of from tens to hundreds of nanometers.

The shape of an aspheric surface is given by the following expression:

$$Z(X) = \frac{X^2/R}{1+\sqrt{1-(K+1)\frac{X^2}{R^2}}} + A_4 X^4 + A_6 X^6 + A_8 X^8 + A_{10} X^{10}$$

wherein Z is the topographic coordinate (height) and X is the lateral coordinate. R and K are respectively the radius of curvature and the conic constant and the parameters $A_4$, $A_6$, $A_8$, $A_{10}$, etc. are asphericity coefficients. The metrological requirements for Z(x) are of the order of $\lambda/25$ ($\approx$10 nm) for measurement repeatability and $\lambda/10$ ($\approx$50 nm) for maximum shape error (accuracy).

No effective solution has been however provided by the prior art so far to the problem of measuring these surfaces through non-contact techniques. This is mainly due to the strong nonlinearity of the aspheric terms $X^{2n}$, which results in that measuring becomes much more critical at points X that are farther from the apex of the surfaces (X=0). The points where the reliability of the measure must be high are the ones in steeper slope areas of the optical surface.

The combination of having a polished surface with a steep slope and the required accuracy at the nanoscale scale causes the metrology of these surfaces with non-contact optical techniques to be a scientific and technical challenge of the highest difficulty.

EP1555561 discloses a non-contact surface configuration measuring method for accurate measurement of a surface at a steep angle to a laser probe. Specific areas including parts inclined ±30° or more from an optimum measurement state relative to the laser probe are measured after a workpiece is rotated such that the surface within the specific areas is less than ±30°. Therefore, accurately measured data on the specific areas can be obtained even in a different coordinate system from that of a general area.

A relevant problem derived from any of the above techniques is the low speed of operation if high accuracy is desired. A further disadvantage is that these methods are non-continuous.

SUMMARY

Alternative methods are presented herein for non-contact measurement of surfaces of aspherical and free form optics in which tolerances are in most cases beyond the limits of mechanical displacements provided by mechanical devices. Alternative devices capable of performing at least some of the steps of this method are also disclosed.

The present methods and devices find particular application in the design, manufacture, representation and metrology of complex small objects, such as lenses, for example, aspheric, free form lenses and the like, whether they are or not symmetric. The present methods and devices also find application in manufacturing injection molds, for example, molds for the above mentioned lenses. It will be however understood that the present devices and methods are not limited to the above applications and they are directed in general to surfaces of small components having a given shape which is desired to be measured.

Throughout the present disclosure, the object to be measured could be also referred to as a sample, workpiece, optical component, etc. One specific example of an object to be measured through the present device according to the disclosed method is an optical lens.

It will be also understood that the meaning of measurement of surfaces within the present context bears on the topographical features of the object under measurement in terms of any of the parameters selected from size, shape, texture (roughness), etc.

A confocal tracking method for non-contact measuring the surface of an object is herein disclosed. This method can be carried out by a measuring device which will be disclosed further below.

The present methods may include projecting light on a target area of the object surface. This target area contains a reference point located at least in a first axis of the object surface. The reference point is the closest point to the in focus point.

As used herein, the condition of being closest to the in focus point means that such reference point is within the depth of field of the optics used to image the object surface.

The in focus points can be determined, for example, as the points in the field of view having the maximum of the axial response of a depth-of-focus algorithm based on structured illumination.

The first axis may correspond to a horizontal axis. The position of the object that is measured along this first axis is varied. This means that the object is displaced relative to a fixed head of the measuring device, which will be disclosed fully below, or vice versa, that is, the head of the measuring device is displaced along this first axis relative to the object to be measured, which remains fixed.

According to the above, a further step is carried out which may include acquiring one image of a field of view area after reflection of the projected light by the object surface including said reference point. This can be carried out, for example, by a standard CCD camera. At this time, the position of the object in a second axis is then determined.

The second axis may correspond to an axis that is perpendicular to the first axis. Therefore, the object to be measured, or the head of the measuring device, can be vertically displaced along this second axis.

As used herein, the term "image" is intended to refer to the result of any reproduction, especially an optical reproduction, of a field of view area of the object surface at a particular position and orientation in space. It may be also referred herein to as photograph, frame, picture, etc.

The above steps are repeated such as light is projected onto the object surface on successive target areas in which there are respective reference points of the object surface in the first axis. A number of images of the respective field of view areas are acquired after reflection of the projected light by the object surface comprising said reference points.

While varying the position of the object that is measured along this first axis, the position of the object is simultaneously varied along the second axis. This is carried out in a way that the reference points are always maintained as close as possible to the in focus point through the use of a confocal tracking algorithm which will be explained further below.

The positions of the object in the first and the second axes are determined, for example by high accuracy position sensors. The position sensors are capable of measuring positions of the object in the second axis in which said images of the field of view comprising the reference points have been acquired.

The principle underlying the present methods is that the light projected on the object surface is a pattern of light with a light distribution along the first axis. Although within the definition of a pattern of light a wide range of forms are included, either in a continuous form or in a discontinuous form, it is preferred for the present methods that a pattern of structured light is projected as a measuring slit that is projected onto the object surface. Within the meaning of the present disclosure, it is to be understood that a measuring slit is a single slit pattern of light formed with a set of points of light substantially forming a line that matches the direction of movement of the object, that is the first axis.

The use of structured illumination is advantageous in the present methods. Projecting a pattern of structured light allows in focus points in the object to be more accurately determined within the field of view.

The present methods may further include determining the position of the in focus point along the first axis for each of the images that have been acquired as disclosed. This allows a corresponding correction differential to be obtained. This correction differential can be defined as a distance along the first axis between the in focus points and the reference points.

Through the above parameters relating to the reference points in the first axis, with said correction differential, and the position of the object in the second axis, an accurate representation of the object surface can be obtained. From the obtained representation of the object surface very precise measurements of the object surface can be obtained. In some applications, the measurements of the object surface obtained through these methods can be compared to predetermined design data such that correction data can be obtained and then supplied, for example, to automatic machining devices, etc.

In a first embodiment of the present methods, the representation of the object surface being measured can be obtained by building a curve having the following form:

$$[(X_1+\Delta_1, Z_1),(X_2+\Delta_2, Z_2) \ldots (X_n+\Delta_n, Z_n)]$$

wherein $(X_1, X_2, \ldots X_n)$ denote the reference points of the object surface in the first axis;

$(Z_1, Z_2, \ldots Z_n)$ denote the respective positions of the object in the second axis; and $(\Delta_1, \Delta_2, \ldots \Delta_n)$ denote the correction differential or residual tracking error defined as the distance along the first axis between the in focus points and the reference points. This correction differential can be converted from pixel units into length units. Correction differential values might be of the order of, for example, up to 1 µm.

In a second embodiment of the present methods, the representation of the object surface may include carrying out a raster scan. Raster scan includes projecting the measuring slit at different positions of the object surface along a third axis. The first axis and the third axis may be perpendicular to each other and to the second axis. The first and the third axes may contain, for example, the horizontal plane onto which the measuring device is standing when in use.

This allows a three dimensional map to be obtained having the following form:

$$[(X_{i1}+\Delta_{i1}, Y_i, Z_{i1}),(X_{i2}+\Delta_{i2}, Y_i, Z_{i2}) \ldots (X_{in}+\Delta_{in}, Y_i, Z_{in})]$$

wherein, for i: 1, 2 . . . m, of the object surface being measured:

$(X_{i1}, X_{i2}, \ldots X_{in})$ denote the reference points of the object surface in the first axis;

$(Z_{i1}, Z_{i2}, \ldots Z_{in})$ denote the respective positions of the object in the second axis;

$(Y_1, Y_2, \ldots Y_m)$ denote the respective positions of the object in the third axis; and $(\Delta_{i1}, \Delta_{i2}, \ldots \Delta_{in})$ denote the correction differential or residual tracking error defined as the distance along the first axis between the in focus points and the reference points. Again, this correction differential can be converted from pixel units into length units to build the three-dimensional map of the object surface. Correction differential values may be, for example, up to 1 µm.

In a third embodiment of the present methods a three dimensional map can be obtained by revolving the object in order to obtain a representation of the object surface through an angular scan. Angular scan includes revolving the object around a fourth axis passing through one point of the object, such as for example a center of rotation of the object. A full representation of the object surface involves the object to be revolved 360° around the fourth axis. In this embodiment of the methods hereof in which an angular scan is performed, the measurement slit is projected at different angular positions of the fourth axis. A three dimensional map can be obtained having the following form:

$$[(X_{i1}+\Delta_{i1}, \theta_i, Z_{i1}),(X_{i2}+\Delta_{i2}, \theta_i, Z_{i2}), \ldots (X_{in}+\Delta_{in}, \theta_i, Z_{in})]$$

wherein, for i: 1, 2 . . . m, of the object surface being measured:

$(X_{i1}, X_{i2}, \ldots X_{in})$ denote the reference points of the object surface in the first axis;

$(Z_{i1}, Z_{i2}, \ldots Z_{in})$ denote the respective positions of the object in the second axis;

$(\theta_1, \theta_2, \ldots \theta_{in})$ denote the respective angular positions of the object in the fourth axis ($\theta$);

and $(\Delta_{i1}, \Delta_{i2}, \ldots \Delta_{in})$ denote the correction differential or residual tracking error defined as the distance along the first axis between the in focus points and the reference points. Again, this correction differential can be converted from pixel units into length units to build the three-dimensional map of the object surface. Correction differential values may be, for example, up to 1 µm.

In any of the above embodiments, the disclosed tracking method is based on a confocal tracking technique in which the relative position of the object is varied along the first axis (preferably at a steady rate) and the second axis simultaneously. In any case, a variation of the position of object being measured should be understood either as a movement of the object relative to the measuring device or as a movement of the measuring device, or a part thereof such as a measuring head, relative to the object being measured. The present methods advantageously retrieve information about the in focus point along the projected measuring slit.

As stated above, the position of the object is varied along the first axis while varying the position of the object along the second axis. This variation of the position of the object along the second axis is performed such that the object surface is always in focus. This is carried out through a depth-of-focus algorithm based on structured illumination. This algorithm may be, for example, a closed loop control based autofocus algorithm and more particularly a closed loop proportional integral derivative controller (PID) based control algorithm.

Through this algorithm, once the object surface is in focus, its position along the first axis (e.g. a lateral direction) is varied while varying its position along the second axis such that it is always in focus. The focus will be maintained substantially at the center of the field of view while the object is moved along the first axis. It is preferred that the variation of the position of the object along the first axis is carried out continuously and at a steady rate.

The PID based control algorithm causes the object being measured to be in focus all the time by varying its position along the second axis while its position along the first axis is varied. In some embodiments, the PID algorithm is a control loop feedback mechanism widely used in industrial control systems. A PID controller attempts to correct the error between a measured process variable and a desired set point by calculating and then outputting a corrective action that can adjust the process accordingly. The PID algorithm is given in proportional, integral and derivative parameters. The proportional parameter determines the reaction to the current error. The integral parameter determines the reaction based on the sum of recent errors. The derivative parameter determines the reaction to the rate at which the error has been changing. By adjusting these parameters in PID algorithm a control action designed for specific process requirements can be obtained. It is not always necessary to use all three parameters.

The present methods may further include the step of determining the reference points for each field of view area that are located at the same predetermined position in said field of view areas.

With the above disclosed confocal tracking methods, both 2D profiles and 3D maps of the object surface can be obtained by varying the position of the object relative to said first, second and fourth axes. This can be carried out through drive units in a measuring device, which will be described in greater detail below.

In combination with any of the above disclosed embodiments of the present methods, a centering step may be additionally performed. This centering step may be useful for accurately positioning the object to be measured in a way that the measuring slit is projected onto the apex position of the object. This step may be particularly relevant for object surfaces with symmetry of revolution.

This centering step may include projecting at least two side slits onto the focal plane of the microscope objective lens. In some embodiments a set of, for example, 20-40 side slits can be projected, for example. These side slits are projected such that they are parallel to the measuring slit.

The side slits are projected such that they are spaced apart from each other and from the measuring slit. This slit separation is given by a distance along the third axis. The different projected side slits intersect the third axis at different points in a way that the measuring slit is between the projected side slits. The position of the object is varied along the third axis until the in focus points along two side slits at both sides of the measuring slit and equally spaced at both sides from the measuring slit are found to be in the same coordinate in the first axis. Then the projected measuring slit will therefore match the apex position of the object.

In further centering steps of the present methods, mechanical means or mechanisms may be alternatively or additionally used for positioning the object to be measured such that the measuring slit is projected onto the apex position of the object.

As stated above, at least some of the steps of the methods hereof can be carried out through a non-contact, high precision, fast measurement device, which will be now disclosed. This device is an optical profiler that is capable of measuring any optical surface from aspheric to flat or free form surfaces. The present non-contact measuring device is therefore useful in a wide range of applications such as optical data storage, lenses in cellphones, digital cameras, projectors as well as high precision applications and so forth.

The disclosed devices may include light projecting equipment. Such light projecting equipment may include, for example, at least one LED, a diaphragm, collimation optics, a mirror, an optical lens, a beam splitter as well as the microscope objective lens.

The light projecting equipment of the present devices are suitably designed for projecting light onto a target area of the object surface to be measured such as an optical lens. This target area that is illuminated by the light projecting equipment contains the above mentioned reference points in the first axis of the object surface that are closest to the in focus point.

The light projecting equipment of the present devices serves the purpose of projecting a pattern of light with a light distribution along the first axis onto the object surface being measured. Such light projecting equipment may include microscope objective lenses. One example of such objective lens may be a Super Long Working Distance (SLWD) infinity corrected Nikon 100× objective lens. This objective lens is characterized by a high numerical aperture (NA) of 0.7 and a working distance of 6.5 mm. Measuring of surfaces with local slopes of up to 35° is ensured through the use of such high numerical aperture lens. On the other hand, due to such a long working distance comfortable operation is allowed without the risk of encountering the object surface, which is very important when the present methods are used by operators in production environments. The 100×SLWD objective lens has a depth of field of about 1 µm such that only parts of the object being measured within a 1 µm region around the focal plane of the objective lens are substantially in focus. Such pattern of light may include a wide range of forms. However, the pattern of light the device is capable to project is preferably a measuring slit. As stated above, this measuring slit can be imaged onto the focal plane of a microscope objective lens along the first axis. The measuring slit is formed from a diaphragm in the light projecting equipment such that this particular pattern is accurately projected onto to the focal plane of the microscope objective lens. A factor of reduction can be applied according to the objective magnification.

The disclosed devices are further provided with image-acquiring apparatus for acquiring images of field of view areas comprising said reference points after reflection of the projected light by the object surface. The image-acquiring apparatus may include microscope objective lenses and a camera. In one specific example of the image-acquiring apparatus, it/they may include a CCD camera forming a confocal arrangement. In such confocal arrangement the measuring slit is imaged by the light projecting equipment onto a plane which, in turn, is imaged by the image-acquiring apparatus onto the CCD camera. The CCD camera is intended for acquiring images of the above mentioned fields of view comprising said reference points after reflection of the projected light by the object surface. The camera of the present devices may be capable of obtaining a number of consecutive images (frames) for a given time (frame rate). In one example, the camera used may obtain at least 50 frames per second (fps). For each of the acquired images the in focus point along the projected measuring slit can be obtained by determining the point having the maximum value of the axial response of a depth-of-focus algorithm based on structured illumination.

The disclosed devices may be further provided with an arrangement for varying the position of the object along the first axis. It is to be noted that the above includes embodiments in which the object is fixed and one or more parts of the measuring devices are moved relative thereto, embodiments of said part of the measuring device may be fixed and the object is moved relative thereto and embodiments involving the combination of the above embodiments relating to the variation of the position of the object being measured.

In one embodiment in which one or more parts of the measuring device are fixed and the object is moved relative thereto, the arrangement for varying the position of the object along the first axis may include at least one high accuracy air bearing stage in combination with a magnetic linear motor. Thanks to the air bearing stage, a small air gap, e.g. of the order of 3 μm, between the object and the device is provided. No contact therefore exists between the arrangement for varying the relative position of the object and the object itself so that continuous and constant relative movement of the object and the device is ensured. In one specific embodiment, the arrangement for varying the relative position of the object along the first axis can be, for example, a 100 mm stroke drive unit model ABL-15010 available from Aerotech. Such drive unit has a flatness error lower than 100 nm. Due to its completely repetitive behavior it can be calibrated such that flatness error may become about 10 nm, which is a value lower than the accuracy expected for the device.

The disclosed devices may be further provided with an arrangement for varying the position of the object along the second axis while simultaneously varying the position of the object along the first axis on the condition that the reference points are maintained as close as possible to the in focus point. Said arrangement for simultaneously varying the position of the object along the second axis may include at least one crossed roller bearing stage. The provision of this type of bearings may be important in order to reduce straightness, flatness and linearity measuring errors.

The arrangement for simultaneously varying the position of the object along the second axis operates according to the above mentioned closed loop algorithm in a coordinated movement such that focus is maintained all the way at the center of the field of view until the desired measurement length is reached.

The present devices may further include a measuring head in which said light projecting apparatus and the image-acquiring equipment are provided. The measuring head may be supported by a column made for example of granite. This material has a high bending strength and very low thermal expansion and it is suitable for high accuracy measurements, of the order of 10 nm.

The disclosed devices may further be provided with an arrangement for determining the positions of respective reference points along the second axis. This may include a high accuracy position sensor and it/they can be also included in the measuring head. They are suitable for accurately determining the relative position of the object along the second axis. In some embodiments, high accuracy position encoders can be used to determine both the position in the first and the second axes, for example high accuracy linear encoders.

In preferred embodiments of the present devices it is envisaged that one or more may further include a centering apparatus for positioning the object to be measured in a way that the measuring slit is projected onto the apex position of the object. This can be done through the use of centering apparatus. In one embodiment, the centering apparatus may include an element for projecting at least two side slits onto the focal plane of the microscope objective lens along corresponding side axes. These side axes may be parallel to the first axis. The side slits are projected onto the focal plane of the microscope objective lens in a way that they are spaced apart from each other a given distance along the third axis. The side slits are projected such that the measuring slit is between the side slits. The centering apparatus may further include an arrangement for varying the position of the object along the third axis until the in focus points along two side slits at both sides of the measuring slit and equally spaced from the measuring slit are found to be in the same coordinate in the first axis.

Through the present devices a raster scan of the object surface can be performed according to the above methods. Raster scan involves a side-to-side sweeping of the object, that is, varying the position of the object along the third axis, while varying the position of the object along the second axis. Raster scan allows a representation of the object surface to be obtained. For this purpose, an arrangement for varying the position of the object along the third axis may be further provided.

The present devices may be also capable of performing an angular scan of an object, particularly of an object surface with symmetry of revolution, according to the above methods, to obtain a representation of its surface. This involves varying the angular position of the object around a fourth axis passing through one point of the object, such as for example a center of rotation thereof. In one specific embodiment, the object is revolved such that the measurement slit is projected at different angular positions of the fourth axis. The device is therefore provided with an apparatus for revolving the object around the fourth axis. Like the raster scan, the angular scan allows a three dimensional map of the object surface to be obtained.

The disclosed devices provide a number of advantages. The use of a confocal arrangement, combined with high numerical aperture objective lenses, provides extremely high depth sectioning capability of the object surface, which, depending on the objective lens, can be better than 2 nm.

The centering apparatus of the present devices allows the apex of the object to be automatically determined without the need to carry out any measurements other than determining that two in focus points are located in the same position along their respective side slits.

In general, the present non-contact surface metrology devices take advantage of the fact that it is suitable for carrying the disclosed methods which are not single-point based methods but image based methods, based on a whole pattern of structured illumination. The use of structured illumination allows points in focus within the field of view to be much more precisely determined.

Furthermore, at least some of the above method steps can be carried out by the present devices in a continuous way so it is not stopped when in use. Measurement speeds of 1 mm/s and even faster can be achieved.

The disclosed methods and devices have been proven to be highly efficient at complex surfaces even in regions with high local slope in which intensity of the reflected light striking the camera is very weak. Depending on sample geometry, microscope objective lenses that can measure slopes up to 65° can be used.

Further advantages of the present methods and devices are high repeatability of measurements, of the order of 10 nm, reduced error in shape accuracy, of the order of 50 nm, high speed, above 1 mm/s, as well as the possibility to analyze data obtained.

Additional objects, advantages and features of embodiments of the present methods and devices will become apparent to those skilled in the art upon examination of the description, or may be learned by practice of the inventions hereof.

BRIEF DESCRIPTION OF THE DRAWINGS

Particular embodiments of the present methods and devices will be described in the following by way of non-limiting examples, with reference to the appended drawings, in which:

FIG. 3 is a diagrammatic top plan view of an enlarged portion of FIG. 2a.

DETAILED DESCRIPTION

The figures illustrate a one exemplary embodiment of a non-contact, high precision, fast measurement device. The non-limiting example of the device that is shown in the FIG. 1 of the drawings has been generally indicated at 100. It is an optical profiler capable of measuring any optical surface. Although it is useful in many applications, the present example relates to a measuring device 100 for non-contact measurement of the surface of a lens. The lens has been generally indicated herein at 300 in the figures.

Figure 1:
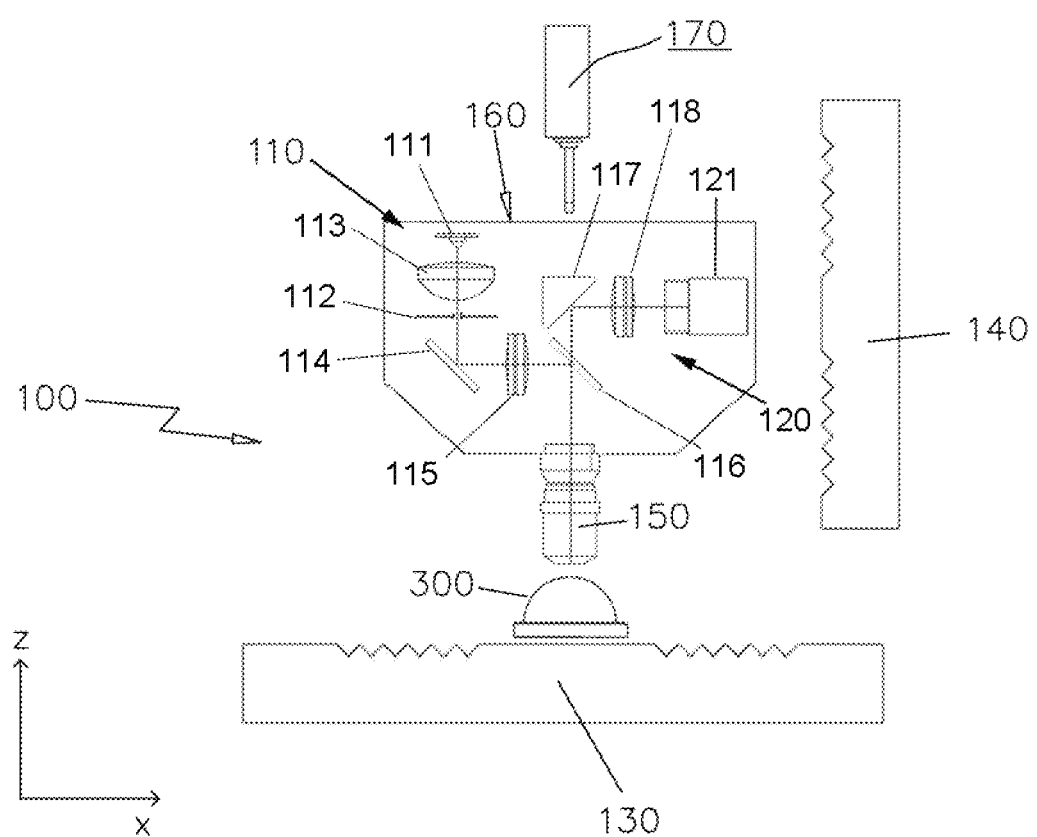
FIG. 1 is a diagrammatic elevational view of one exemplary embodiment of a device for non-contact measuring the surface of an object.

The measuring device 100 includes light projecting equipment 110 that include one or a series of LEDs 111. Such light projecting equipment 110 in the device 100 shown are suitable for projecting a pattern of structured light m onto a target area of the lens 300 through a diaphragm 112. As shown in FIG. 1 the light projecting equipment 110 further include collimation optics 113, a 45° mirror 114, an optical lens 115, a beam splitter 116 as well as a microscope objective lens 150.

Figure 2A:
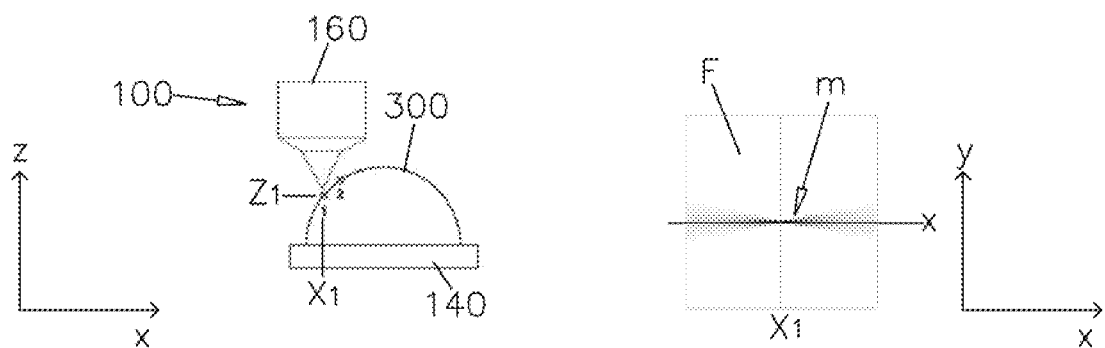
FIGS. 2a, and 2b are diagrammatic views of the device in FIG. 1 shown in different steps of a method hereof that are performed for non-contact measuring of the object surface.
Figure 2B:
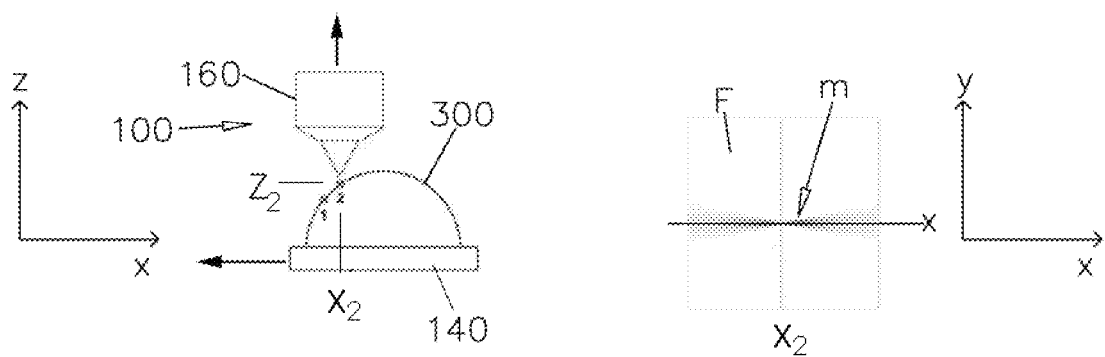

The target area of the lens 300 contains reference points $X_1, X_2, X_3 \ldots X_n$, one of which, $X_1$, is shown in the FIGS. 2a and 2b of the drawings. The reference points $X_1, X_2, X_3 \ldots X_n$ are in a horizontal axis x of the lens 300. The reference points $X_1, X_2, X_3 \ldots X_n$ are those being closest to the in focus point, shown at P in the drawings, that is, those within the depth of field of the optics 150 used to image the surface of the lens 300. The above mentioned pattern of structured light projected by the projecting equipment 110 in the device 100 shown has a light distribution along the horizontal axis x in the form of a measuring slit m, as shown in the FIGS. 2a, 2b and 3 of the drawings.

The measuring slit m is therefore projected onto the focal plane of the microscope objective lenses 150 along the horizontal axis x. An objective lens 150 used was a Super Long Working Distance (SLWD) infinity corrected Nikon 100× objective lens with high numerical aperture (NA) of 0.7 and a working distance of 6.5 mm. The 100×SLWD objective lens has a depth of field of about 1 µm such that only parts of the object being measured within a 1 µm region around the focal plane of the objective lens 150 are substantially in focus.

The measuring device 100 may further include an image-acquiring apparatus 120 which, in the particular example shown, includes a CCD camera 121 with a frame rate of the order of 50 fps. For each of the acquired images the in focus point P along the projected measuring slit m can be obtained by determining the point having the maximum value of the axial response of a depth-of-focus algorithm based on structured illumination. The camera 121 is capable of acquiring images of field of view areas F comprising reference points $X_1, X_2, X_3 \ldots X_n$ after reflection of the projected light by the surface of the lens 300.

The image-acquiring apparatus 120 further includes the above microscope lens (which is shared both by the light projecting equipment 110 and the image-acquiring apparatus 120), a mirror 117 and a field lens 118. The beam splitter 116 couples the light projecting equipment 110 with the image-acquiring apparatus 120.

The measuring device 100 further includes an arrangement 130 for varying the position of the lens 300 along the horizontal axis x, that is, for causing the lens 300 to be laterally displaced.

Figure 3:
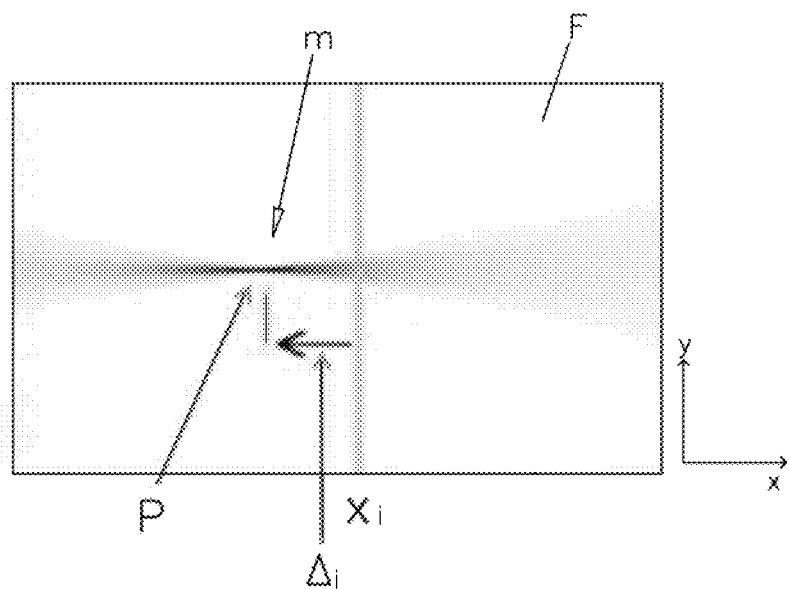

The measuring device 100 further includes an arrangement 140 for displacing the measuring head 160 along the vertical axis z, that is, for causing the measuring head 160 to be vertically displaced along the vertical axis z such that the reference points $X_2, X_3 \ldots X_n$ are maintained as close as possible to the in focus point P as shown in the FIGS. 2a, 2b and 3.

The arrangement 130 varying the position of the lens 300 along horizontal axis x may include at least one high accuracy air bearing stage. An exemplar stage used was a 100 mm stroke drive unit model ABL-15010 available from Aerotech.

As for the arrangement 140 for simultaneously varying the position of the lens 300 along the vertical axis z, in the embodiment shown they may include one or more crossed roller bearing stages.

The provision of both arrangements 130, 140 allows the measuring head 160 to be moved vertically along axis z while simultaneously moving the lens 300 horizontally along axis x such that the reference points $X_1, X_2, X_3 \ldots X_n$ are maintained as close as possible to the in focus point P according to a closed loop tracking algorithm.

The device 100 may also be provided with an arrangement 170 for determining the positions $Z_1, Z_2, Z_3 \ldots Z_n$ of the reference points $X_1, X_2, X_3 \ldots X_n$ in the vertical axis z. In addition, an arrangement for determining the positions of the lens 300 in the horizontal axis x may also be provided. All or some of these arrangements for determining the positions of the lens 300 may include high accuracy linear encoders.

It is to be noted that points $Z_1, Z_2, Z_3 \ldots Z_n$ in vertical axis z are related to the vertical position of a point of the lens 300 that is being measured by the device 100. In this respect, the arrangement 140 for varying the position of the lens 300 along the vertical axis z cause the measuring head to be vertically displaced along axis z resulting in points $Z_1, Z_2, Z_3 \ldots Z_n$ (corresponding to points that are in focus by the above tracking algorithm) of the lens 300 to be varied along said axis z.

The light projecting equipment 110 and the image-acquiring apparatus 120 may both be encased into a measuring head 160 that is provided in the measuring device 100. This measuring head 160 is supported by a granite column (not shown) for higher accuracy measurements.

The disclosed device 100 can be operated for carrying out the following steps in order to perform a non-contact, high precision, fast measurement of lens 300:

projecting a measuring slit m onto a target area of the surface of the lens 300 to be measured in which there is a reference point $X_1$ in the horizontal axis x that is closest to the in focus point P, as shown in the FIG. 2a of the drawings;

acquiring one image corresponding to a field of view area F after reflection of the projected light by the surface of the lens 300 comprising this reference point $X_1$;

determining the vertical position $Z_1$ of the lens 300 in the vertical axis z;

projecting the measuring slit m onto the surface of the lens 300 on successive target areas in which there are respective reference points $X_2, X_3 \ldots X_n$ of the lens 300 in said horizontal axis x;

acquiring a number of images of the respective field of view areas F after reflection of the projected light by the surface of the lens 300 comprising the reference points $X_2, X_3 \ldots X_n$ by simultaneously varying the vertical position $Z_2, Z_3 \ldots Z_n$ of the measuring head 160 along the vertical axis z while maintaining the reference points $X_2, X_3 \ldots X_n$ as close as possible to the in focus point P, as shown in FIG. 2a or 2b;

determining the vertical positions $Z_2, Z_3 \ldots Z_n$ for each corresponding positions of the lens 300 in which the images of the field of view areas F comprising the reference points $X_2, X_3 \ldots X_n$ have been acquired, determining the position of the in focus point P along the horizontal axis x for each of the acquired images;

calculating corresponding correction differentials $\Delta_1, \Delta_2 \ldots \Delta_n$, as shown in FIG. 3 of the drawings, as a distance along horizontal axis x between the in focus points P and the reference points $X_1, X_2 \ldots X_n$ (correction differentials $\Delta_1, \Delta_2 \ldots \Delta_n$ are then converted from pixel units into length units and it is of the order of up to 1 μm), and obtaining a representation of the surface of the lens 300 through the reference points $X_1, X_2, \ldots X_n$ in the horizontal axis x with the correction differential $\Delta_1, \Delta_2, \ldots \Delta_n$ and the vertical position $Z_1, Z_2, \ldots Z_n$ of the lens 300 in the vertical axis z.

The measuring device 100, when operated according to above mentioned method steps, is capable of providing a 2D profile of the surface of the lens 300. More particularly, the measuring device 100 is capable of providing an accurate profile of the surface of the lens 300 according to the following curve: $[(X_1+\Delta_1, Z_1), (X_2+\Delta_2, Z_2) \ldots (X_n+\Delta_n, Z_n)]$.

In addition, when operated according to above mentioned method steps, the measuring device 100 may further be capable of providing a 3D map of the lens 300. More particularly, the measuring device 100 can be capable of providing:

an accurate representation of the surface of the lens 300 according to a three dimensional map $[(X_{i1}+\Delta_{i1}, Y_i, Z_{i1}), (X_{i2}+\Delta_{i2}, Y_i, Z_{i2}) \ldots (X_{in}+\Delta_{in}, Y_i, Z_{in})]$, for i: 1, 2 ... m, of the surface of the lens 300 by carrying out a raster scan in which the measuring slit is projected at different positions $Y_1, Y_2, \ldots Y_m$ of a third axis y, perpendicular to the first axis x; and providing a representation of the surface of the lens 300 according to a three dimensional map $[(X_{i1}+\Delta_{i1}, \theta_i, Z_{i1}), (X_{i2}+\Delta_{i2}, \theta_i, Z_{i2}) \ldots (X_{in}+\Delta_{in}, \theta_i, Z_{in})]$, for i: 1, 2, ... m, of the surface of the lens 300 by carrying out an angular scan including revolving the lens 300 around an axis passing through a center of rotation thereof such that the measurement slit is projected at different angular positions $\theta_1, \theta_2, \ldots \theta_m$ of a fourth axis passing through the lens 300.

A suitable curve analysis, such as best fitting and/or nominal shape comparison analysis, software can be used to process 2D profile and 3D map of the lens 300. This software may be part of the device 100 or it may be run from a remotely located computer system.

Although only a number of particular devices and examples of the present devices and methods have been disclosed herein, it will be understood by those skilled in the art that other alternative embodiments and/or uses and obvious modifications and equivalents thereof are possible.

The present disclosure covers all possible combinations of the particular embodiments described herein and should not be limited by particular embodiments, but should be determined only by a fair reading of the claims that follow.

The invention claimed is:

1. A method for non-contact three dimensional object surface imaging, the method comprising:

projecting light onto a target area of an object surface in which there is a reference point $X_1$ in at least a first axis x of the object surface and an in focus point $P_1$ which may be offset from the reference point $X_1$, the projecting being such that the in focus point $P_1$ is placed as close as possible to said reference point $X_1$ by adjusting the position of the object along a second axis z so as to determine the position $Z_1$ of the object in said second axis;

acquiring a first image of a field of view area F after reflection of the projected light by the object surface comprising said reference point $X_1$ the first image containing the position of the first reference point $X_1$ in the first axis x;

determining the position $Z_1$ of the object in said second axis z and associating the position $Z_1$ with the first image so that the first image contain the position of the position $Z_1$ in the second axis z;

moving the object along the first axis x and the second axis z;

projecting light onto the object surface on successive target areas in which there are other reference points $X_2, X_3 \ldots X_n$ of the object surface in said first axis x;

acquiring a number of subsequent additional sequential images of the respective field of view areas F in the same way after reflection of the projected light by the object surface comprising said other reference points $X_2, X_3 \ldots X_n$ by simultaneously varying the position of the object along the first axis x and the second axis z in order to maintain the other reference points $X_2, X_3 \ldots X_n$ as close as possible to the respective in focus points $P_2, P_3, \ldots P_n$ within said field of view area F; the number of subsequent additional sequential images containing the position of other reference points $X_2, X_3, \ldots X_n$ in the first axis x and other positions of the object $Z_2, Z_3, \ldots Z_n$ in the second axis z; and determining the positions $Z_2, Z_3 \ldots Z_n$ of the object for the corresponding target areas in which there are the other reference points $X_2, X_3 \ldots X_n$; the number of subsequent additional sequential images containing the other positions of the object $Z_2, Z_3, \ldots Z_n$ in the second axis z;

wherein said operations of projecting light onto a target area of an object surface are carried out by projecting a pattern of light with a light distribution along at least said first axis x; and wherein the method further comprises:

determining the position of the in focus points $P_2, P_3, \ldots P_n$ along the first axis x for each of the acquired images;

calculating a corresponding correction differential $\Delta_1, \Delta_2 \ldots \Delta_n$ as a distance along the first axis x between said in focus points $P_2, P_3, \ldots P_n$ and the reference point $X_1$ and the other reference points $X_2, X_3 \ldots X_n$; and obtaining a representation of the object surface, said representation involving at least parameters relating to the reference point $X_1$ and the other reference points $X_2, X_3 \ldots X_n$ in the first axis x with said correction differential $\Delta_1, \Delta_2 \ldots \Delta_n$ and the position $Z_1, Z_2, \ldots$ $Z_n$ of the object in the second axis z in the form of $(X_1+\Delta_1, Z_1), (X_2+\Delta_2, Z_2) \ldots (X_n+\Delta_n, Z_n)$ wherein each $(X_i+\Delta_i, Z_i)$ corresponds to each of said acquired images.

2. The method of claim 1, wherein the pattern of light projected onto the object surface is a measuring slit m projected onto the focal plane of a microscope objective lens along the first axis x.

3. The method of claim 1, wherein said step of obtaining a representation of the object surface comprises building a curve $(X_1+\Delta_1, Z_1), (X_2+\Delta_2, Z_2) \ldots (X_n+\Delta_n, Z_n)$ involving parameters relating to the reference point $X_1$ and the other reference points $(X_2, X_3 \ldots X_n)$ in the first axis x with said correction differential $\Delta_1, \Delta_2 \ldots \Delta_n$ and the position $Z_1$, $Z_2, \ldots Z_n$ of the object in the second axis z such that a curve giving the profile of the object surface being measured is determined.

4. The method of claim 3, wherein the step of obtaining a representation of the object surface comprises carrying out a raster scan consisting in projecting the measuring slit m at different positions $Y_1, Y_2, \ldots Y_m$ of a third axis y in order to obtain a three dimensional map $(X_{i1}+\Delta_{i1}, Y_i, Z_{i1}), (X_{i2}+\Delta_{i2}, Y_i, Z_{i2}) \ldots (X_{in}+\Delta_{in}, Y_i, Z_{in})$, for i: 1, 2 . . . m, of the object surface being measured, said map involving parameters relating to the reference points $X_{i1}, X_{i2}, \ldots X_{in}$ of said three dimensional map in the first axis x with the corresponding correction differentials $\Delta_{i1}, \Delta_{i2}, \ldots \Delta_{in}$, at different positions $Y_1, Y_2, \ldots Y_m$ of the third axis y, and corresponding positions $Z_{i1}, Z_{i2}, \ldots Z_{in}$ of the object in the second axis z.

5. The method of claim 3, wherein the step of obtaining a representation of the object surface comprises carrying out an angular scan consisting in revolving the object around an axis passing through one point of the object such that the measurement slit m is projected at different angular positions $\theta_1, \theta_2, \ldots \theta_m$ of a fourth axis $\theta$ in order to obtain a three dimensional map $(X_{i1}+\Delta_{i1}, \theta_i, Z_{i1}), (X_{i2}+\Delta_{i2}, \theta_i, Z_{i2}), \ldots (X_{in}+\Delta_{in}, \theta_i, Z_{in})$, for i: 1, 2, . . . m, of the object surface being measured, said map involving parameters relating to the reference points $X_{i1}, X_{i2}, \ldots X_{in}$ of said three dimensional map in the first axis x with corresponding correction differentials $\Delta_{i1}, \Delta_{i2}, \ldots \Delta_{in}$, at different angular positions $\theta_1, \theta_2, \ldots \theta_m$ of the fourth axis $\theta$, and corresponding positions $Z_{i1}, Z_{i2}, \ldots Z_{in}$ of the object in the second axis z.

6. The method of claim 2, wherein it further includes a centering step for positioning the object to be measured in a way that the measuring slit m is projected onto the apex position of the object, said centering step comprising:

projecting at least two side slits onto the focal plane of the microscope objective lens, the side slits being substantially parallel to the measuring slit m and spaced apart therefrom a given distance along a third axis y such that the measuring slit m is between the side slits; and varying the position of the object along the third axis y until the in focus points P along two side slits at both sides of the measuring slit m and equally spaced at both sides from the measuring slit m are found to be in the same coordinate in the first axis x.

7. The method of claim 1, wherein the simultaneously varying the position of the object along the first axis x and the second axis z moving of the second axis z to maintain the in focus point P as close as possible to the other reference points $X_2, X_3 \ldots X_n$ is carried out by using a depth-of-focus algorithm based on structured illumination.

8. The method of claim 1, further comprising the step of determining said reference point and the other reference points $X_1, X_2, X_3 \ldots X_n$ for each field of view area F that are located at the same predetermined position in said field of view areas F.

9. The method of claim 1, wherein the in focus points P are determined as the points in the field of view having the maximum of the axial response, said axial response representing how the signal of a depth-of-focus algorithm based on structured illumination changes along the first axis x.

10. The method of claim 1, wherein it further comprises the step of converting the correction differential $\Delta_1, \Delta_2 \ldots \Delta_n$ from pixel units into length units.

11. The method of claim 10, wherein said correction differential $\Delta_1, \Delta_2 \ldots \Delta_n$ is equal or less than 1 µm.

12. A device for non-contact three dimensional object surface imaging, wherein the device comprises:

light projecting equipment for projecting light onto a target area of an object surface in which there are reference points $X_1, X_2, X_3 \ldots X_n$ in a first axis x of the object surface closest to the in focus point P, said light projecting equipment being suitable for projecting a pattern of light onto the object surface, the pattern of light comprising at least one measuring slit m to be projected onto the focal plane of a microscope objective lens with a light distribution along the first axis x;

image-acquiring apparatus for acquiring one image of field of view areas F comprising said reference points $X_1, X_2, X_3 \ldots X_n$ after reflection of the projected light by the object surface;

an arrangement for determining the positions $Z_1, Z_2, Z_3 \ldots Z_n$ of respective reference points $X_1, X_2, X_3 \ldots X_n$ in a second axis z;

an arrangement for varying the position of the object along the first axis x;

an arrangement for simultaneously varying the position of the object along the first axis x and the second axis z such that the in focus point P is maintained as close as possible to the reference points $X_1, X_2, X_3 \ldots X_n$; finding a corresponding correction differential $\Delta_1, \Delta_2 \ldots \Delta_n$ as a distance along the first axis x between said in focus point P and the reference point $X_1$ and the other reference points $X_2, X_3 \ldots X_n$; the varied position of the object being in the form of $(X_1+\Delta_1, Z_1), (X_2+\Delta_2, Z_2) \ldots (X_n+\Delta_n, Z_n)$ wherein each $(X_i+\Delta_i, Z_i)$ corresponds to each image acquired by the image-acquiring apparatus, and a centering apparatus for positioning the object to be measured in a way that the measuring slit m is projected onto the apex position of the object, said centering apparatus comprising:

an element for projecting at least two side slits onto the focal plane of the microscope objective lens along corresponding side axes x', the side axes x' being substantially parallel to the first axis x and spaced apart therefrom a given distance along a third axis y such that the measuring slit m is between the side slits; and an arrangement for varying the position of the object along the third axis y until the in focus points P along two side slits at both sides of the measuring slit m and equally spaced at both sides from the measuring slit m are found to be in the same coordinate in the first axis x.

13. The device of claim 12, wherein the light projecting equipment comprises at least one LED, a diaphragm, collimation optics, a mirror, an optical lens, a beam splitter and a microscope objective lens.

14. The device of claim 12, further including an arrangement for varying the position of the object along the third axis y for carrying out a raster scan in order to obtain a representation of the object surface.

15. The device of claim 12, further including an arrangement for varying the angular position of the object around a fourth axis θ passing through one point of the object for carrying out an angular scan in order to obtain a representation of the object surface.

16. The device of claim 12, wherein the arrangement for determining the positions $Z_1, Z_2, Z_3 \ldots Z_n$ of the object in the second axis z comprises a position sensor.

* * * * *